(12) United States Patent
Kaku et al.

(10) Patent No.: US 11,146,496 B2
(45) Date of Patent: Oct. 12, 2021

(54) RELAY DEVICE

(71) Applicant: DENSO CORPORATION, Kariya (JP)

(72) Inventors: Yoshifumi Kaku, Kariya (JP); Taichi Itagawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 66 days.

(21) Appl. No.: 16/800,166

(22) Filed: Feb. 25, 2020

(65) Prior Publication Data

US 2020/0296052 A1   Sep. 17, 2020

(30) Foreign Application Priority Data

Mar. 11, 2019   (JP) .............................. JP2019-043580

(51) Int. Cl.
*H04L 12/863*   (2013.01)
*H04L 29/08*   (2006.01)
*H04L 12/26*   (2006.01)

(52) U.S. Cl.
CPC ...... *H04L 47/6255* (2013.01); *H04L 43/0876* (2013.01); *H04L 47/621* (2013.01); *H04L 47/6215* (2013.01); *H04L 67/1097* (2013.01)

(58) Field of Classification Search
None
See application file for complete search history.

(56) References Cited

U.S. PATENT DOCUMENTS

| | | | | |
|---|---|---|---|---|
| 5,787,086 | A | * | 7/1998 | McClure ........... G06F 15/17375 370/413 |
| 7,027,457 | B1 | * | 4/2006 | Chiussi ................... H04L 47/11 370/414 |
| 2002/0093910 | A1 | | 7/2002 | Yazaki et al. |
| 2002/0163914 | A1 | * | 11/2002 | Dooley ............... H04L 49/3081 370/394 |
| 2003/0095560 | A1 | * | 5/2003 | Arita ....................... H04L 47/30 370/431 |
| 2003/0219026 | A1 | * | 11/2003 | Sun ......................... H04L 47/20 370/412 |
| 2005/0163049 | A1 | | 7/2005 | Yazaki et al. |

(Continued)

FOREIGN PATENT DOCUMENTS

| | | |
|---|---|---|
| JP | H09-149066 A | 6/1997 |
| JP | 2000-232470 A | 8/2000 |
| JP | 2017-147583 A | 8/2017 |

*Primary Examiner* — Ajit Patel
(74) *Attorney, Agent, or Firm* — Posz Law Group, PLC

(57) ABSTRACT

A relay device includes: multiple ports; a queue for each port storing a transmission scheduled frame and having a variable storage capacity with a minimum guarantee value; a shared storage area having a predetermined storage capacity for each queue; and a storage controller controlling to store the transmission scheduled frame in each queue. The storage controller stores the transmission scheduled frame in a storage destination queue when a usage storage capacity of the storage destination queue does not exceed the minimum guarantee value. The storage controller uses a free area as the storage destination queue and stores the transmission scheduled frame in the storage destination queue when the shared storage area has the free storage area for storing the transmission scheduled frame and the usage storage capacity of the storage destination queue exceeds the minimum guarantee value.

6 Claims, 5 Drawing Sheets

(56) References Cited

U.S. PATENT DOCUMENTS

2005/0286420 A1* 12/2005 Kusumoto .......... H04L 12/5601
370/230
2009/0003329 A1* 1/2009 Murakami .............. H04L 47/10
370/389
2020/0004607 A1* 1/2020 Mahajani ................ H04L 43/04

* cited by examiner

FIG. 2

MIN GUARANTEE VAL

|  | Q0 | Q1 |  |
|---|---|---|---|
| P0T | 4 | 4 |  |
| P1T | 4 | 4 |  |
| P2T | 4 | 16 |  |
| P3T | 4 | 4 |  |
| P4T | 4 | 4 |  |
| P5T | 16 | 4 |  |
| P6T | 4 | 4 | TOTAL |
| P7T | 4 | 4 | 88 |

FIG. 3

MAX ALLOWABLE VAL

|  | Q0 | Q1 |  |
|---|---|---|---|
| P0T | 16 | 16 |  |
| P1T | 16 | 16 |  |
| P2T | 16 | 16 |  |
| P3T | 16 | 16 |  |
| P4T | 16 | 16 |  |
| P5T | 16 | 16 |  |
| P6T | 16 | 16 | TOTAL |
| P7T | 16 | 16 | 255 |

RELAY DEVICE

CROSS REFERENCE TO RELATED APPLICATION

The present application claims the benefit of priority from Japanese Patent Application No. 2019-43580 filed on Mar. 11, 2019. The entire disclosure of the above application is incorporated herein by reference.

TECHNICAL FIELD

The present disclosure relates to a relay device.

BACKGROUND

As a relay device configuring a network of a star topology, there is, for example, an Ethernet switch. Ethernet is a registered trademark. The switch relays a frame by transmitting a frame received from any of multiple ports from a port to which a device of a destination of the frame is connected, among the multiple ports.

SUMMARY

According to an example embodiment, a relay device may include: multiple ports; a queue for each port storing a transmission scheduled frame and having a variable storage capacity with a minimum guarantee value; a shared storage area having a predetermined storage capacity for each queue; and a storage controller controlling to store the transmission scheduled frame in each queue. The storage controller stores the transmission scheduled frame in a storage destination queue when a usage storage capacity of the storage destination queue does not exceed the minimum guarantee value. The storage controller uses a free area as the storage destination queue and stores the transmission scheduled frame in the storage destination queue when the shared storage area has the free storage area for storing the transmission scheduled frame and the usage storage capacity of the storage destination queue exceeds the minimum guarantee value.

BRIEF DESCRIPTION OF THE DRAWINGS

The above and other objects, features and advantages of the present disclosure will become more apparent from the following detailed description made with reference to the accompanying drawings. In the drawings:

FIG. 2 is an illustrative diagram showing an example of a minimum guarantee value of a capacity of a queue;

FIG. 3 is an illustrative diagram showing an example of a maximum allowable value of the capacity of the queue;

DETAILED DESCRIPTION

Figure 1:
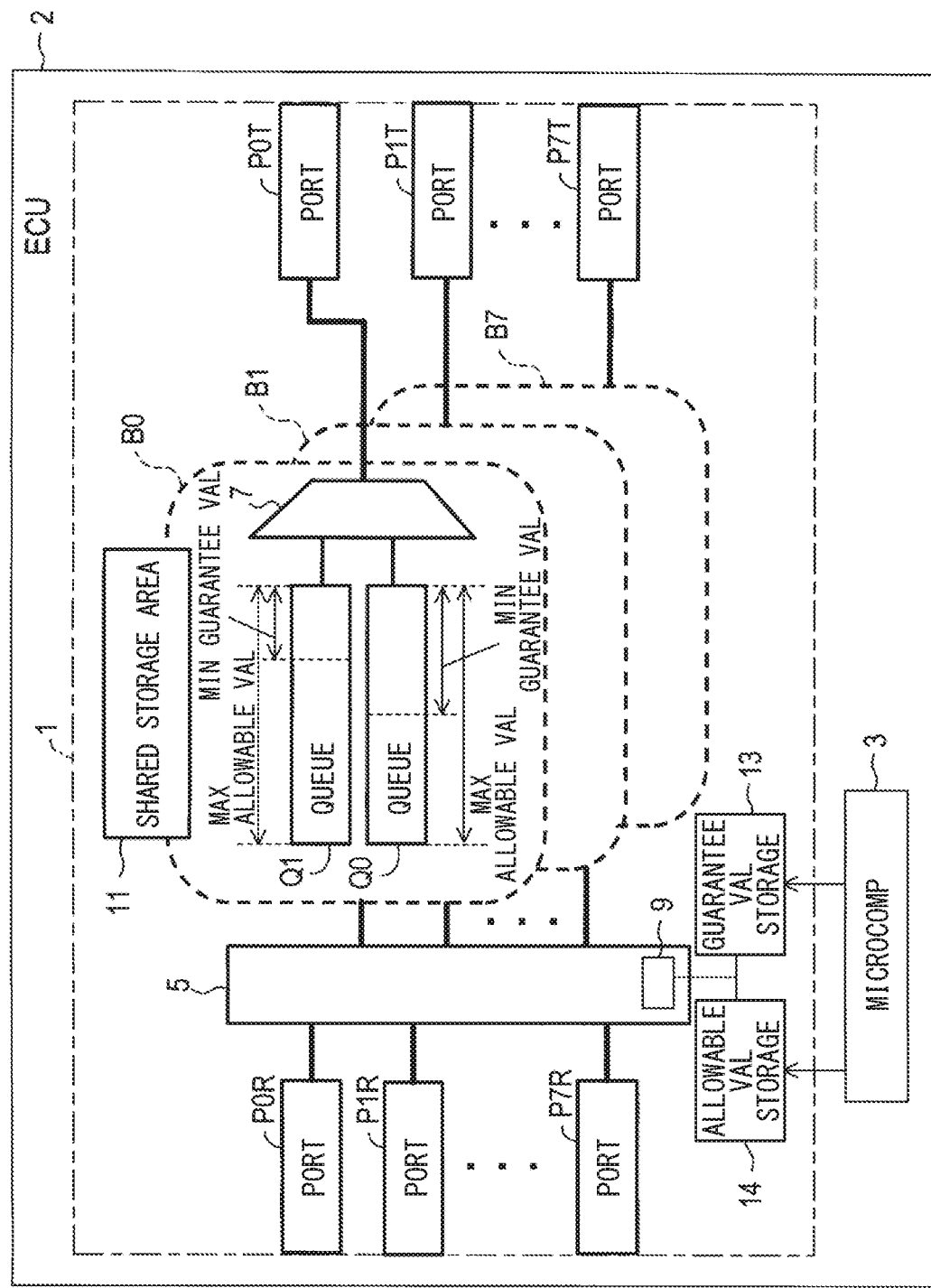
FIG. 1 is a block diagram showing a configuration of a relay device according to an embodiment.

For example, a conceivable technique described below teaches a relay device including a packet storage FIFO in which a packet to be transmitted from each of multiple transmission circuits is stored for the transmission circuit, and configured to transmit a packet stored in the packet storage FIFO from the transmission circuit. Similarly, in the Ethernet switch, a queue in which a frame scheduled to be transmitted is stored is provided for each of the multiple ports, and the frame stored in each queue is transmitted from the port corresponding to the queue.

As a result of a detailed examination by the present inventors, the following difficulties have been found with respect to the relay device having the queue in which the frames scheduled to be transmitted are stored for the multiple ports.

When a bandwidth of a communication path connected to a specific port temporarily increases due to a cause such as a concentration of the frames from the multiple ports to the specific port, that is, when a burst traffic occurs, the multiple frames waiting for transmission are accumulated in a queue corresponding to the specific port. Then, when the queue overflows, the frame cannot be accumulated in the queue, leading to a frame loss. In the present specification, the frame loss means that a frame scheduled to be transmitted (that is, a frame to be relayed) is lost. In order to improve a frame loss inhibition performance (hereinafter referred to as burst tolerance) due to the burst traffic described above, it is considered that the capacity of each queue is set to be sufficiently large in advance. However, a large capacity of the queue is wasted in a normal state in which the burst traffic is not generated or in a port in which the burst traffic is not generated. Conversely, if the capacity of each queue is set to the minimum capacity required at normal times, the burst tolerance cannot be obtained.

A relay device is provided to be capable of achieving both a burst tolerance and a minimum frame storage performance while reducing a total capacity of all queues.

According to an example embodiment, a relay device includes: a plurality of ports; at least one queue arranged for each of the ports, storing a transmission scheduled frame which is to be transmitted from a corresponding port, having a variable storage capacity with a minimum guarantee value of storage capacity; a shared storage area having a predetermined storage capacity for each queue; and a storage controller controlling to store the transmission scheduled frame in each queue. The storage controller stores the transmission scheduled frame in a storage destination queue, which is one of queues in which the transmission scheduled frame is to be stored, when a usage storage capacity of the storage destination queue does not exceed the minimum guarantee value of the storage destination queue. The storage controller uses a free area as the storage destination queue and stores the transmission scheduled frame in the storage destination queue in a case where the shared storage area has the free storage area for storing the transmission scheduled frame when the usage storage capacity of the storage destination queue exceeds the minimum guarantee value of the storage destination queue According to the configuration described above, the transmission scheduled frames can be stored in each queue for at least a minimum guarantee value of the queue. Thus, a minimum frame storage performance is guaranteed for each queue, in other words, a minimum frame transfer performance is guaranteed for each port.

Even if the use capacity of the storage destination queue exceeds the minimum guarantee value, if there is a free area in the shared storage area that can store the transmission scheduled frame, the free area is used as a storage destination queue. Then, the transmission scheduled frame is stored in the storage destination queue by the free area. For that reason, when the transmission scheduled frames are concentrated in the specific queue among the queues provided at least one for each port, the transmission scheduled frames in an amount and number exceeding the minimum guarantee value can be stored in the specific queue, thereby being capable of realizing the burst tolerance described above.

Therefore, according to the relay device according to one aspect of the present disclosure, as compared with a configuration in which the capacity of each queue is set sufficiently large in advance, the burst tolerance and the minimum frame storage performance can be made compatible while reducing the total capacity of all the queues.

Embodiments of the present disclosure will be described below with reference to the drawings.

1. Configuration

A relay device 1 according to an embodiment shown in FIG. 1 is provided, for example, in an ECU 2 mounted on a vehicle. Then, the relay device 1 relays a communication between other ECUs mounted on the vehicle. The ECU is an abbreviation for "Electronic Control Unit", that is, an abbreviation for an electronic control device. The ECU 2 is also provided with a microcomputer 3 as a processing unit for performing each processing for controlling the operation of the ECU 2.

The relay device 1 includes, for example, eight ports for transmitting and receiving frames. Hereinafter, in each of the eight ports, a portion of hardware (for example, a reception circuit) for receiving the frames is referred to as reception ports P0R to P7R, and a portion of hardware (for example, a transmission circuit) for transmitting the frames is referred to as transmission ports P0T to P7T. Further, when the reception ports P0R to P7R and the transmission ports P0T to P7T are generically referred to without any particular distinction, those ports are referred to as ports P0 to P7. The number of ports may be other than 8.

Each of the ports P0 to P7 is connected with any of the multiple ECUs different from the ECU 2 through a relay device having the same configuration as that of the relay device 1, or not through a relay device.

The relay device 1 transmits the frame received by any of the reception ports P0R to P7R from the transmission port to which the ECU of the destination of the frame is connected among the transmission ports P0T to P7T. In the present embodiment, the frame is a frame based on the Ethernet standard (that is, an Ethernet frame).

The relay device 1 further includes an input processing unit 5 and buffer units B0 to B7 corresponding to the transmission ports P0T to P7T, respectively. Each of the buffer units B0 to B7 includes a first queue Q0, a second queue Q1, and a scheduler 7.

Each of the queues Q0 or Q1 stores a frame to be transmitted from a transmission port corresponding to the queue Q0 or Q1 (that is, transmission scheduled frame), in details, stores a frame to be transmitted from a transmission port corresponding to a buffer unit provided with the queue Q0 or Q1. At least two levels of priority are set in the frame relayed by the relay device 1. For example, the lower priority frame is stored in the first queue Q0, and the higher priority frame is stored in the second queue Q1.

Determination of the transfer destination port of the frame received from the reception ports P0R to P7R, that is, determination to transmit the frame from which of the transmission ports P0T to P7T, and storage of the frame in one of the queues Q0 and Q1 corresponding to the transmission port of the transfer destination are performed by the input processing unit 5. The input processing unit 5 includes a storage control unit 9 as a functional part for controlling the storage of the frames in the queues Q0 and Q1. The transmission of the frames stored in the queues Q0 and Q1 from the transmission port is performed by the scheduler 7.

The input processing unit 5 and the scheduler 7 may be realized by, for example, a digital circuit, an analog circuit, or a combination of the digital circuit and the analog circuit. The input processing unit 5 and the scheduler 7 may be implemented with the use of a microcomputer. In this case, the functions of the input processing unit 5 and the scheduler 7 may be realized by causing the CPU to execute a program stored in the non-transitory tangible storage medium.

2. Description of Queues

In the following description, each of the queues Q0 and Q1 means each of the queues Q0 and Q1 for each of the transmission ports P0T to P7T. All of the queues Q0 and Q1 mean all the queues Q0 and Q1 for each of the transmission ports P0T to P7T.

Each of the queues Q0 and Q1 has a variable capacity. In each of the queues Q0 and Q1, a minimum guarantee value and a maximum allowable value are set for the capacity. The minimum guarantee value is a capacity value guaranteed to be usable, in other words, a least guaranteed value of capacity. The maximum allowable value is a maximum capacity value that can be used if a predetermined condition is satisfied.

The relay device 1 is provided with a shared storage area 11 used as each of the queues Q0 and Q1. The shared storage area 11 may be, for example, a memory storage area. The memory may be, for example, a RAM or a rewritable non-volatile memory.

In the capacities of the queues Q0 and Q1, a fixed storage area may be used for the minimum guarantee value, and the shared storage area 11 may be used for the amount exceeding the minimum guarantee value, but in the present embodiment, the shared storage area 11 is used as all the capacities including the minimum guarantee values of the queues Q0 and Q1.

When the capacity of the shared storage area 11 that is available as each of the queues Q0 and Q1 is referred to as a total capacity, the minimum guarantee value of each of the queues Q0 and Q1 is set so that the total (that is, the total of the minimum guarantee values of each of the queues Q0 and Q1) falls below a total capacity. Also, the maximum allowable value of each of the queues Q0 and Q1 can be set such that the total (that is, the total of the maximum allowable values of each of the queues Q0 and Q1) exceeds the total capacity.

For example, if the total capacity is 128 KB, the minimum guarantee value of each of queues Q0 and Q1, as exemplified in FIG. 2, each of the queues Q0 and Q1 of the transmission ports P0T, P1T, P3T, P4T, P6T, and P7T, the queue Q0 of the transmission port P2T and the queue Q1 of the transmission port P5T may be set to 4 KB, and the queue Q1 of the transmission port P2T and the queue Q0 of the transmission port P5T may be set to 16 KB. The maximum allowable values of the queues Q0 and Q1 may be set to 16 KB for the queues Q0 and Q1 of the transmission ports P0T to P7T, as illustrated in FIG. 3. In FIGS. 2 and 3, numerical values described are capacity values, and the unit of the capacity values is "KB". "KB" means "kilobytes". The numerical values are exemplified and are not limited.

As shown in FIG. 1, the relay device 1 includes a guarantee value storage unit 13 in which the minimum guarantee values of the queues Q0 and Q1 are written, and an allowable value storage unit 14 in which the maximum allowable values of the queues Q0 and Q1 are written.

In the guarantee value storage unit 13 and the allowable value storage unit 14, the minimum guarantee value or the maximum allowable value of each of the queues Q0 and Q1 is written by, for example, the microcomputer 3. The microcomputer 3 corresponds to a device outside the relay device 1. In the relay device 1, the minimum guarantee value of each of the queues Q0 and Q1 is set to a value written in the guarantee value storage unit 13 for the queue. In the same manner, the maximum allowable value of each of the queues Q0 and Q1 is set to a value written in the allowable value storage unit 14 for that queue.

In the relay device 1, the storage control unit 9 uses the shared storage area 11 as each of the queues Q0 and Q1 by at least managing and storing which area in the shared storage area 11 is used as which queue and which area is free.

Then, the storage control unit 9 performs the following processes <1> to <4>, for a storage destination queue.

The storage destination queue is a queue in which a transmission scheduled frame is to be stored among the queues Q0 and Q1. The transmission scheduled frame is a frame received by any of the reception ports P0R to P7R (that is, a received frame). More specifically, the storage destination queue is one of the two queues Q0 and Q1 corresponding to the transmission port to which the ECU of the destination of the received frame is connected, which corresponds to the priority of the received frame.

<1> If the use capacity of the storage destination queue does not exceed the minimum guarantee value of the queue, the transmission scheduled frame is stored in the storage destination queue. More specifically, an area corresponding to the data amount of the transmission scheduled frame in the free area in the shared storage area 11 is used as a storage destination queue, and the transmission scheduled frame is stored in that area.

However, if the total use capacity of all the queues Q0 and Q1 exceeds the total capacity due to the storage of the transmission scheduled frame, that is, if there is no free area in the current shared storage area 11 in which the transmission scheduled frame can be stored, the following process <2> is performed.

<2> The frame stored in a queue whose use capacity exceeds the minimum guarantee value of the queue among the queues other than the storage destination queue is discarded (that is, deleted), thereby generating a free area in which the transmission scheduled frame can be stored in the shared storage area 11. In that case, for example, the previously stored frame among the frames stored in an appropriate queue is preferentially discarded. Then, the free area generated by discarding the frame is used as a storage destination queue, and the transmission scheduled frame is stored in the storage destination queue. In other words, an area of the free area corresponding to the data amount of the transmission scheduled frame is used as a storage destination queue, and the transmission scheduled frame is stored in that area.

<3> Even if the use capacity of the storage destination queue exceeds the minimum guarantee value of the queue, if the use capacity of the storage destination queue does not exceed the maximum allowable value of the queue, and if there is a free area in the shared storage area 11 in which the transmission scheduled frame can be stored, the free area is used as the storage destination queue to store the transmission scheduled frame in the storage destination queue.

<4> If the use capacity of the storage destination queue exceeds the minimum guarantee value of the queue, and the use capacity of the storage destination queue also exceeds the maximum allowable value of the queue, or if there is no free area in the shared storage area 11 in which the transmission scheduled frame can be stored, the transmission scheduled frame is discarded without being stored.

3. Processing Performed by Storage Control Unit

Next, the storage control process performed by the storage control unit 9 will be described with reference to a flowchart of FIG. 4.

Figure 4:
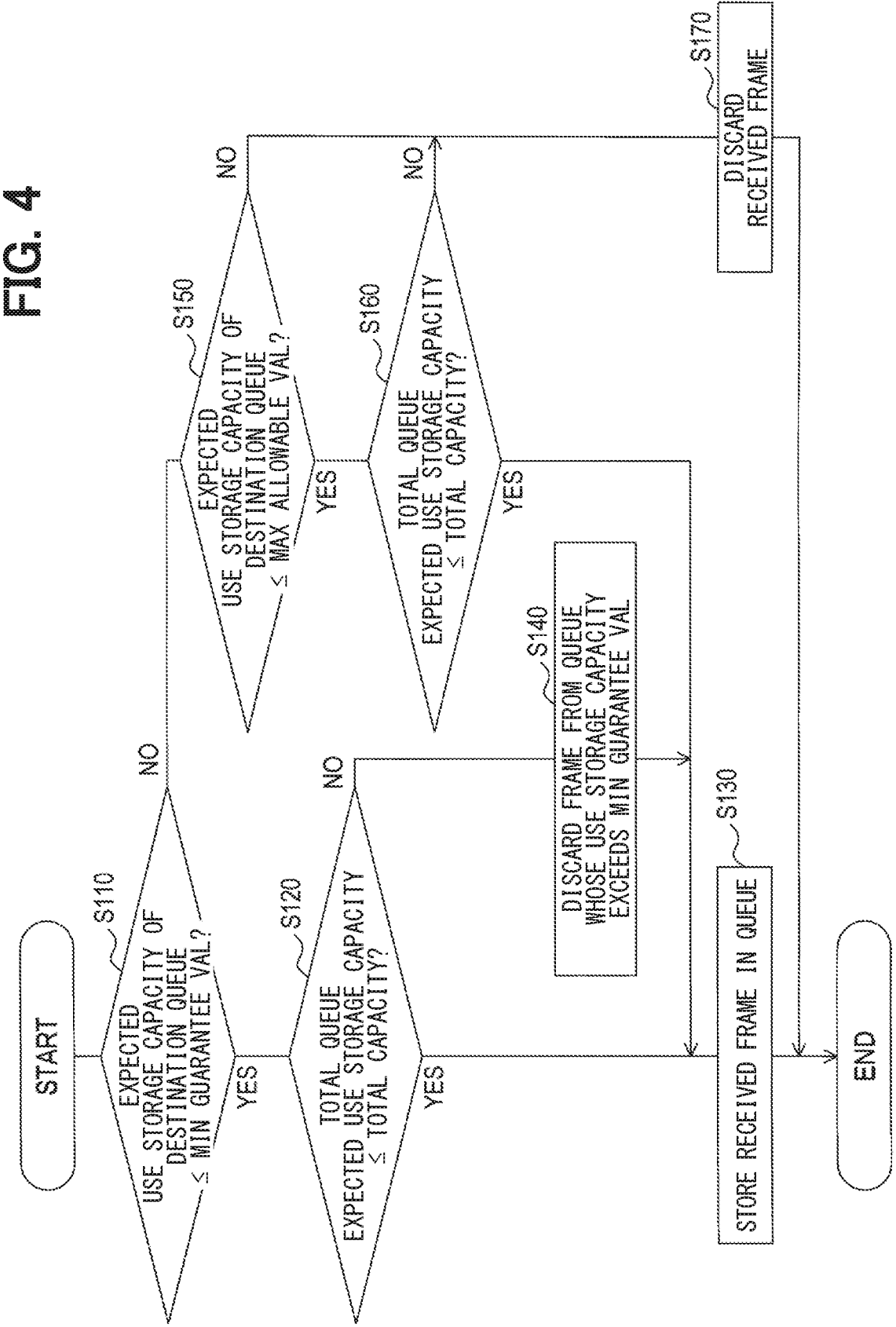
FIG. 4 is a flowchart of a storage control process.

When a frame is received by any of the reception ports P0R to P7R and a queue (that is, a storage destination queue) in which the received frame is to be stored is determined by the input processing unit 5, the storage control unit 9 performs the storage control process of FIG. 4. In the description with reference to FIG. 4, the received frame is a frame stored in the storage destination queue, and corresponds to the transmission scheduled frame in the description of the processes <1> to <4>.

As shown in FIG. 4, in the storage control process, the storage control unit 9 determines whether or not the expected use capacity, which is the total of the use capacity of the storage destination queue and the received frame size, is equal to or less than the minimum guarantee value of the storage destination queue in S110. The received frame size is the data amount of the received frame.

If it is determined in S110 that an expected use capacity of the storage destination queue is equal to or less than the minimum guarantee value, the storage control unit 9 determines that the use capacity of the storage destination queue does not exceed the minimum guarantee value even if the received frame is stored, and proceeds to S120.

Then, in S120, the storage control unit 9 determines whether or not the total queue expected use capacity, which is a total value of the total use capacity of all the queues Q0 and Q1 and the received frame size, is equal to or less than the total capacity.

If it is determined in S120 that the expected use capacity of all the queues is equal to or smaller than the total capacity, the storage control unit 9 determines that the total use capacity of all the queues Q0 and Q1 does not exceed the total capacity even if the received frame is stored, that is, that there is a free area in the shared storage area 11 in which the received frame can be stored, and proceeds to S130.

Then, the storage control unit 9 stores the received frame in the storage destination queue in S130. More specifically, as described above, an area corresponding to the same size as that of the received frame size in the free area in the shared storage area 11 is used as a storage destination queue, and the received frame is stored in the area. Thereafter, the storage control process is terminated.

When it is determined in the above S120 that the expected use capacity of all the queues is not equal to or smaller than the total capacity, the storage control unit 9 determines that there is no free area in the shared storage area 11 in which the received frame can be stored, and proceeds to S140.

Then, in S140, the storage control unit 9 performs a process of generating a free area in the shared storage area 11 in the above process <2>. In other words, a frame stored in a queue whose use capacity exceeds the minimum guarantee value of the queue among the queues other than the storage destination queue is discarded, thereby generating a free area in which the received frame can be stored in the shared storage area 11.

Thereafter, the storage control unit 9 proceeds to S130, and stores the received frame in the storage destination queue with the use of the free area generated in the process of S140 as the storage destination queue. More specifically, as described above, an area corresponding to the data amount of the received frame in the free area generated in the process of S140 is used as the storage destination queue, and the received frame is stored in the area. Then, thereafter, the storage control process is terminated.

When it is determined in the above S110 that the expected use capacity of the storage destination queue is not equal to or less than the minimum guarantee value, the storage control unit 9 determines that the use capacity of the storage destination queue exceeds the minimum guarantee value by storing the received frame, and proceeds to S150.

In S150, the storage control unit 9 determines whether or not the expected use capacity of the storage destination queue is equal to or smaller than the maximum allowable value of the storage destination queue.

If it is determined in S150 that the expected use capacity of the storage destination queue is equal to or less than the maximum allowable value, the storage control unit 9 determines that the use capacity of the storage destination queue does not exceed the maximum allowable value even if the received frame is stored, and proceeds to S160.

In S160, similarly to S120, the storage control unit 9 determines whether or not expected use capacity of all the queues is equal to or less than the total capacity, and proceeds to S130 when it is determined that the expected use capacity of all the queues is equal to or less than the total capacity. Then, in this S130, after the received frame has been stored in the storage destination queue, the storage control process is terminated.

When the storage control unit 9 determines "NO" in either of S150 and S160, that is, when the storage of the received frame causes the use capacity of the storage destination queue to exceed the maximum allowable value, or when there is no free area in the shared storage area 11 in which the received frame can be stored, the storage control unit 9 proceeds to S170.

Then, in S170, the storage control unit 9 discards the received frame without storage, and then terminates the storage control process.

In the storage control process of FIG. 4, the processing when the determination of "YES" is made in S110 and the process proceeds to S130 corresponds to the above process <1>.

Then, the processing when the process proceeds to S130 after the determination of "YES" is made in S110 and the determination of "NO" is made in S120, and the process in S140 is performed, corresponds to the above process <2>.

In addition, the processing when the determination of "NO" is made in S110, the determination of "YES" is made in S150, and the determination of "YES" is made in S160, and the processing when proceeding to S130 corresponds to the above process <3>.

Further, the processing when determination of "NO" is made in S110 and the determination of "NO" is made in S150, or the determination of "NO" is made in S160 and the process proceeds to S170 corresponds to the above process <4>.

4. Operation Example

Figure 5:
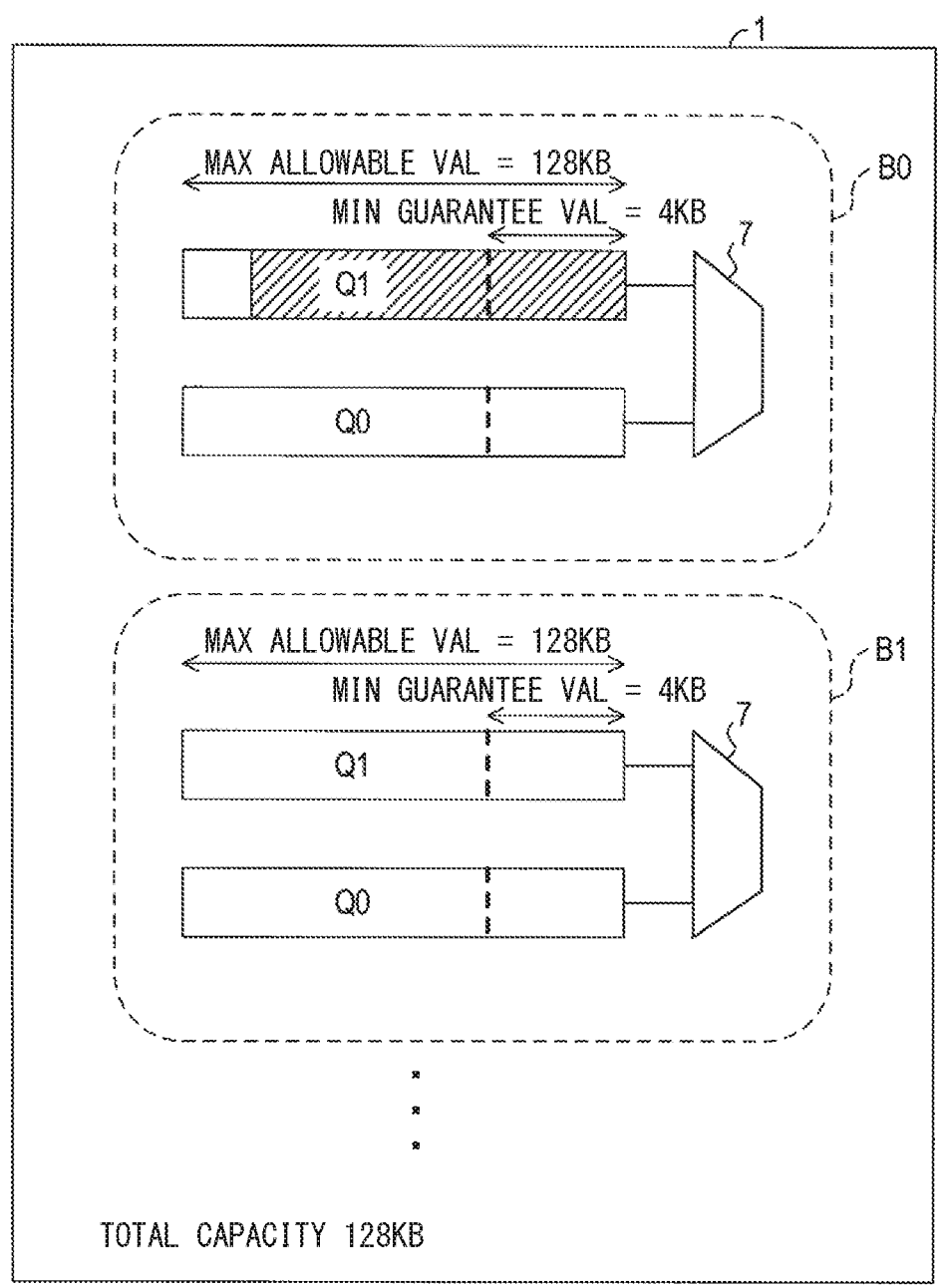
FIG. 5 is a first illustrative diagram illustrating an example of the operation.

For example, as shown in FIG. 5, it is assumed that the total capacity is 128 KB, and the maximum allowable values of the queues Q0 and Q1 are also set to 128 KB.

It is assumed that a frame destined for an ECU connected to the transmission port P0T and having a priority to be stored in the second queue Q1 of the first queue Q0 and the second queue Q1 is continuously received.

In that case, each of the received frames is stored in the queue Q1 of the buffer unit B0 corresponding to the transmission port P0T within a range in which the use capacity of the queue Q1 does not exceed the maximum allowable value, as indicated by a hatched portion in FIG. 5. If the use capacity of the queue Q1 exceeds the maximum allowable value, the received frame is discarded without being stored.

When a frame has already been stored in another queue and there is no free area in the shared storage area 11 where the received frame can be stored before reaching the maximum allowable value after the use capacity of the queue Q1 of the buffer unit B0 exceeds the minimum guarantee value, the received frame from that point in time is discarded without being stored.

As described above, even if the use capacity of the queue exceeds the minimum guarantee value, the received frame is stored in the queue of the storage destination if there is a free area in the shared storage area 11 where the received frame can be stored and the use capacity of the queue does not exceed the maximum allowable value.

Figure 6:
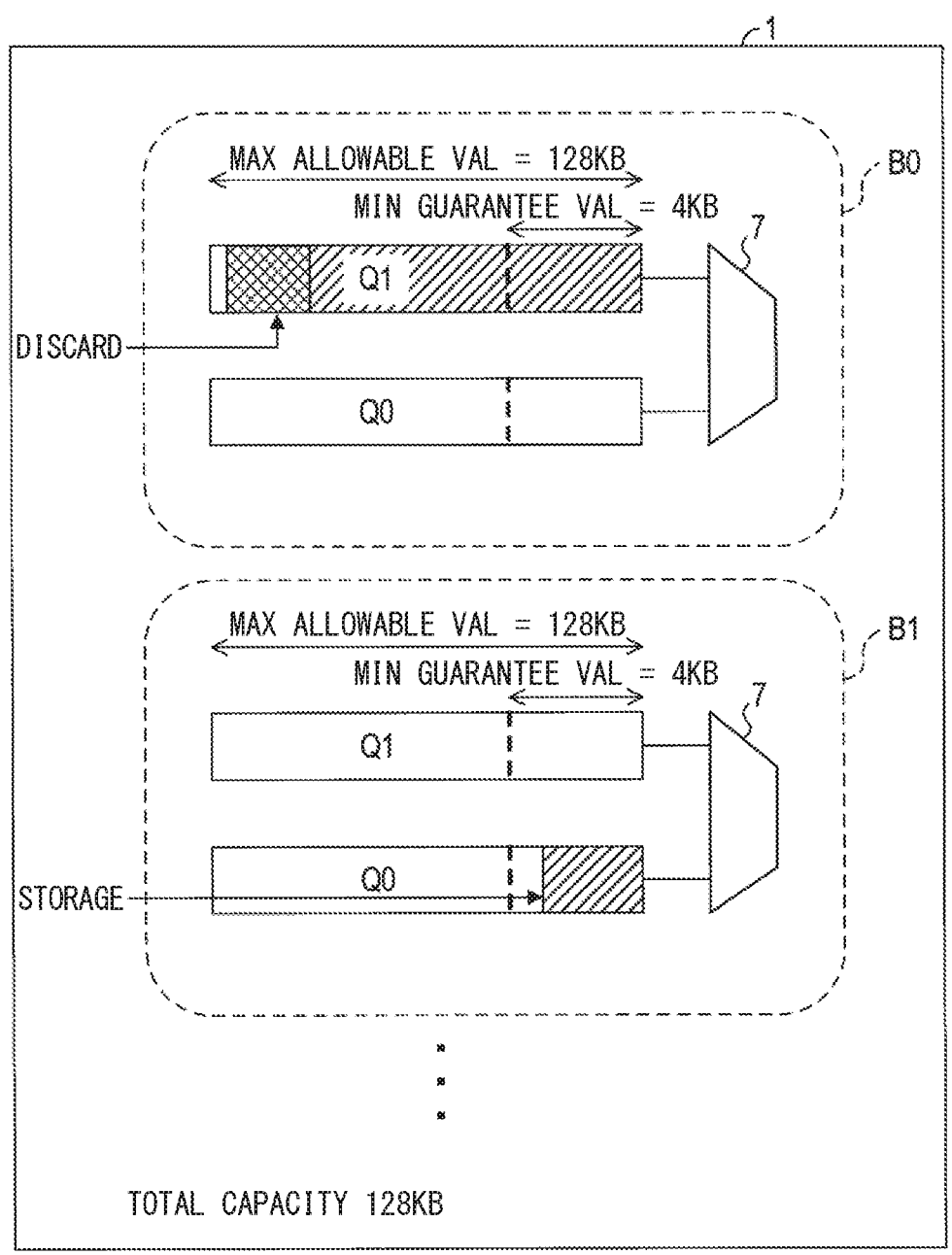
FIG. 6 is a second illustrative diagram illustrating an example of the operation.

On the other hand, also, in the example shown in FIG. 6, the total capacity is set to 128 KB, and the maximum allowable value of each of the queues Q0 and Q1 is set to 128 KB.

In all of the queues Q0 and Q1, it is assumed that the use capacity of the queue Q1 of the buffer unit B0 exceeds the minimum guarantee value, but the use capacity of the other queues is less than the minimum guarantee value and is, for example, 0, and that there is no free area in the shared storage area 11 in which additional frames can be stored.

In this state, for example, it is assumed that even if a frame to be stored in the queue Q0 of the buffer unit B1 is received and the received frame is stored, the use capacity of the queue Q0 of the buffer unit B1 does not exceed the minimum guarantee value.

In that case, as shown in (1) and a portion cross-hatched in FIG. 6, the frame stored in the queue Q1 of the buffer unit B0 is discarded (that is, erased), thereby creating a free area in the shared storage area 11 in which the received frame can be stored. The free area is used as the queue Q0 of the buffer unit B1, and the received frame is stored in the queue of the buffer unit B1 as shown in (2) in FIG. 6.

As described above, as long as the use capacity of the queue of the storage destination does not exceed the minimum guarantee value, the received frame is stored in the queue.

5. Effects

According to the embodiment described in detail above, the following effects are obtained.

(1) The minimum guarantee value of the capacity is set in each of the queues Q0 and Q1 In each of the queues Q0 and Q1, a transmission scheduled frame (that is, a received frame) can be stored at least as much as the minimum guarantee value of the queue. Therefore, the minimum frame storage performance is guaranteed for each queue, in other words, the minimum frame transfer performance is guaranteed for each of the ports P0T to P7T.

As a comparative example, a configuration is conceivable in which the shared storage area 11 is used as the queues Q0 and Q1, but the minimum guarantee values of the queues Q0 and Q1 are not set. In the configuration of the above comparative example, when the use capacity of one or more queues becomes large, there is a possibility that the capacity of other queues cannot be secured at all, that is, there is a possibility that a queue in which no frame can be stored is generated. This results in a transmission port where a frame cannot be transferred, which in turn impairs the relay function of the frame. However, according to the present embodiment, the problem of the comparative example is avoided.

In the present embodiment, even if the use capacity of the storage destination queue exceeds the minimum guarantee value, if there is a free area in the shared storage area 11 in which the transmission scheduled frame can be stored, the free area is used as the storage destination queue to store the transmission scheduled frame. For that reason, when the transmission scheduled frames are concentrated in a certain queue, the amount and the number of transmission scheduled frames exceeding the minimum guarantee value can be stored in the queue, and the burst tolerance can be realized.

Therefore, according to the present embodiment, while inhibiting the total capacity of all the queues Q0 and Q1, both the burst tolerance and the minimum frame storage performance can be achieved.

(2) The maximum allowable value of the capacity is also set in each of the queues Q0 and Q1. In each of the queues Q0 and Q1, a transmission scheduled frame is stored within a range in which the use capacity of the queue does not exceed the maximum allowable value. For that reason, the use capacity of a specific queue is easily inhibited from becoming excessively large.

(3) The total value of the maximum allowable values of the queues Q0 and Q1 is larger than the total capacity that can be used by all the queues Q0 and Q1. For that reason, the use capacity of each of the queues Q0 and Q1 can be avoided from being excessively inhibited. In other words, more capacity can be used for the queue of the transmission port in which the burst traffic has occurred among the multiple transmission ports P0T to P7T.

(4) When the use capacity of the storage destination queue does not exceed the minimum guarantee value and there is no free area in the shared storage area 11 in which the transmission scheduled frame can be stored, the above process <2> is performed.

For that reason, as long as the use capacity of the queue of the storage destination does not exceed the minimum guarantee value, the storage of the received frame in the queue can be performed. In other words, the minimum guarantee of the capacity of each of the queues Q0 and Q1 can be surely realized.

(5) The minimum guarantee value of each of the queues Q0 and Q1 is set to a value written in the guarantee value storage unit 13 by the microcomputer 3. The maximum allowable value of each of the queues Q0 and Q1 is set to a value written in the allowable value storage unit 14 by the microcomputer 3.

Therefore, the minimum guarantee value and the maximum allowable value of each of the queues Q0 and Q1 can be set to arbitrary values. It is also possible to change the minimum guarantee value and the maximum allowable value of each of the queues Q0 and Q1 according to the situation.

6. Other Embodiments

Although the embodiments of the present disclosure have been described above, the present disclosure is not limited to the embodiments described above, and various modifications can be made to implement the present disclosure.

As described above, in the capacities of the queues Q0 and Q1, the fixed storage area different from the shared storage area 11 may be used as the minimum guarantee value, and the shared storage area 11 may be used as an amount exceeding the minimum guarantee value. In that case, the storage control process of FIG. 4 may be modified as shown in (A) and (B) to be described below.

(A) If S120 and S140 are deleted and the determination of "YES" is made in S110, the process of S130 is performed.

(B) In S160, it is determined whether or not there is a free area in which the received frame can be stored in the shared storage area 11 as an amount exceeding the minimum guarantee value.

The number of queues for each port is not limited to 2, and may be 1 or 3 or more.

The relay device 1 and its technique described in the present disclosure may be implemented by a dedicated computer provided by configuring a processor and a memory programmed to execute one or more functions embodied by a computer program. Alternatively, the relay device 1 and its technique described in the present disclosure may be implemented by a dedicated computer provided by configuring a processor by one or more dedicated hardware logic circuits. Alternatively, the relay device 1 and its technique described in the present disclosure may be implemented by one or more dedicated computers configured by a combination of a processor programmed to perform one or more functions and a memory and a processor configured by one or more hardware logic circuits. The computer program may also be stored on a computer readable non-transitory tangible recording medium as computer executable instructions. The technique for realizing the functions of the respective units included in the relay device 1 does not necessarily need to include software, and all of the functions may be realized with the use of one or multiple hardware.

In addition, multiple functions of one component in the above embodiment may be realized by multiple components, or a function of one component may be realized by multiple components. In addition, multiple functions of multiple components may be realized by one component, or a single function realized by multiple components may be realized by one component. In addition, a part of the configuration of the above embodiment may be omitted.

In addition to the relay device 1 described above, the present disclosure may be realized in various forms such as a system having the relay device 1 as a component, a program for causing a computer to function as the relay device 1, a non-transitory actual recording medium such as a semiconductor memory in which the program is recorded, and a frame buffering method in the relay device 1.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S110. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A relay device comprising:
a plurality of ports;
at least one queue arranged for each of the ports, storing a transmission scheduled frame which is to be transmitted from a corresponding port, having a variable storage capacity with a minimum guarantee value of storage capacity;
a shared storage area having a predetermined storage capacity for each queue; and
a storage controller controlling to store the transmission scheduled frame in each queue, wherein:
the storage controller stores the transmission scheduled frame in a storage destination queue, which is one of queues in which the transmission scheduled frame is to be stored, when a usage storage capacity of the storage destination queue does not exceed the minimum guarantee value of the storage destination queue; and
the storage controller uses a free area as the storage destination queue and stores the transmission scheduled frame in the storage destination queue in a case where the shared storage area has the free storage area for storing the transmission scheduled frame when the usage storage capacity of the storage destination queue exceeds the minimum guarantee value of the storage destination queue.

2. The relay device according to claim 1, wherein:
each queue has a maximum allowable value of the storage capacity; and
the storage controller stores the transmission scheduled frame in the storage destination queue within a range in which the usage storage capacity of the storage destination queue does not exceed the maximum allowable value of the storage destination queue.

3. The relay device according to claim 2, wherein:
a sum of maximum allowable values of the queues is larger than a total storage capacity available for the queues.

4. The relay device according to claim 1, wherein:
the shared storage area provides all of storage capacities including the storage capacity of the minimum guarantee value of each queue; and
in a case where the shared storage area has no free storage area for storing the transmission scheduled frame when the usage storage capacity of the storage destination queue does not exceed the minimum guarantee value of the storage destination queue, the storage controller discards a frame stored in a queue whose usage storage capacity exceeds the minimum guarantee value of the queue to generate the free storage area for of storing the transmission scheduled frame in the shared storage area, uses at least a part of the free area as the storage destination queue, and stores the transmission scheduled frame in the storage destination queue.

5. The relay device according to claim 1, further comprising:
a guarantee value storage unit in which the minimum guarantee value of each queue is written by an external device disposed outside the relay device, wherein;
the minimum guarantee value of each queue is set to a value written in the guarantee value storage unit.

6. The relay device according to claim 2, further comprising
an allowable value storage unit in which the maximum allowable value of each queue is written by an external device disposed outside the relay device, wherein;
the maximum allowable value of each queue is set to a value written in the allowable value storage unit.

* * * * *